(No Model.)
C. L. WAGANDT.
HANDLE FOR SHEET METAL VESSELS.
No. 590,781. Patented Sept. 28, 1897.
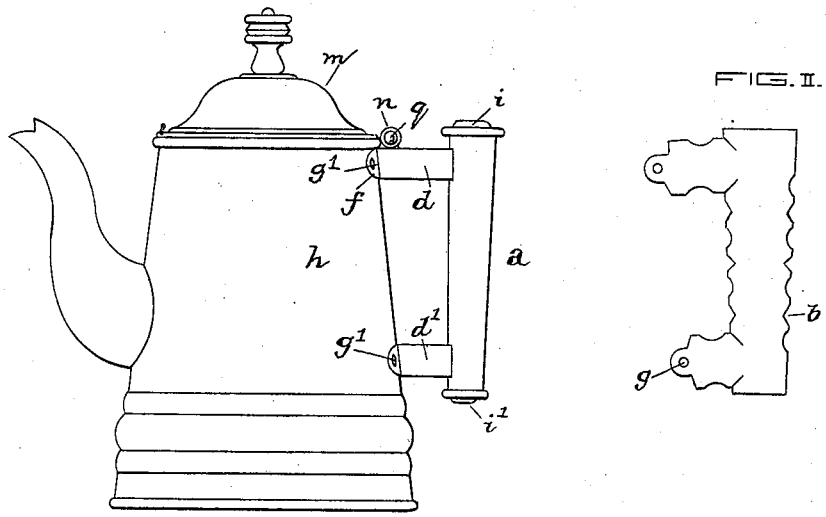
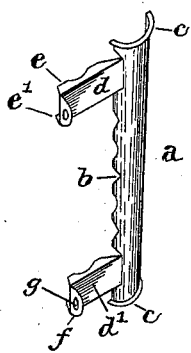
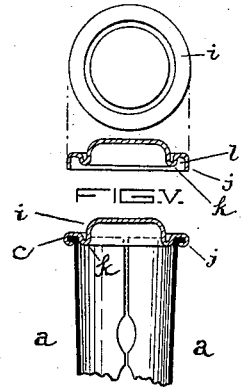
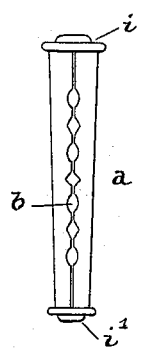
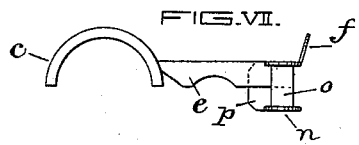
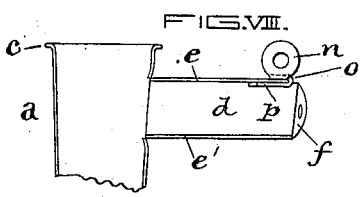
WITNESSES:
Charles B. Mann Jr.
Chapin A. Ferguson.
INVENTOR:
Charles L. Wagandt
By Chas B. Mann
Atty

UNITED STATES PATENT OFFICE.

CHARLES L. WAGANDT, OF BALTIMORE, MARYLAND.

HANDLE FOR SHEET-METAL VESSELS.

SPECIFICATION forming part of Letters Patent No. 590,781, dated September 28, 1897.

Application filed June 21, 1897. Serial No. 641,552. (No model.)

*To all whom it may concern:*

Be it known that I, CHARLES L. WAGANDT, a citizen of the United States, residing at Baltimore, in the State of Maryland, have invented certain new and useful Improvements in Handles for Sheet-Metal Vessels, of which the following is a specification.

This invention relates to a sheet-metal handle for vessels of various kinds, such as coffee and tea pots and dish-pans.

The object of the invention is to provide a sheet-metal handle in which the parts comprising the handle are united without rivets or solder and which on a vessel containing hot liquid will maintain a comparatively cool condition.

The invention is illustrated in the accompanying drawings, in which—

Figure 1 is a view of a pot with the improved handle attached. Fig. 2 is a view of a sheet-metal blank in the flat state cut out for one-half of a handle. Fig. 3 shows a perspective view of one-half of the handle formed from the blank seen in Fig. 2. Fig. 4 shows two views of the top disk. Fig. 5 is a section of the upper end of the handle. Fig. 6 is a rear elevation of the handle. Fig. 7 is a top view of one-half of the handle with the hinge-clip attached. Fig. 8 is an elevation showing the inside of the same parts shown in Fig. 7.

The handle is made entirely of sheet metal and composed of two halves or similar parts which are united by two heads or disks, one at each end.

The metal blank from which one-half of the handle is made is seen in the flat state in Fig. 2. This is then formed by a suitable die into the shape shown in Fig. 3. The hand-grasp part $a$ of one-half is half-cylindric and its longitudinal edges are notched, as at $b$. Its ends have outward flanges $c$. Two lateral arms $d\,d'$ are integral with the said half-handle. Each arm has a flat vertical side and top and bottom horizontal flanges $e\,e'$ bent from said vertical side. At the end of each arm is a lateral flange $f$, with a rivet-hole $g$ for securing it to the body $h$ of the vessel. Two halves having the features just described are placed with their longitudinal edges together, and these parts $a$ make a cylindric hand-grasp, and the edges of the top and bottom flanges $e\,e'$ of the arms come together; also, the flanges $c$ on the ends of each half come to a position where the end disks $i$ and $i'$ will take over them. These disks are made with a rim-flange $j$, an annular shoulder $k$, and an annular groove $l$ between the rim-flange and said shoulder. The outward flange $c$ on the end of the two half-cylindric hand-grasps is entered into the annular groove $l$, and then by means of suitable tools the rim-flange $j$ on the disk is closed inward and locks on the said outward flange $c$. Both ends are thus fastened together.

It will be seen that the rim-flange $j$ prevents the two halves $a$ from spreading apart, and the annular shoulder $k$ prevents them from collapsing, and both halves are firmly held and form the hand-grasp.

A part of the hinge for the lid $m$ is attached to the upper lateral arm $d$. This hinge part comprises two ears $n$, both secured to the same base $o$, and a lower clip part $p$, also attached to the base, is bent forward below the base, and thus two parts of a clip or gripper are formed, consisting of the base $o$ and lower part $p$. The base part $o$ takes over or above the two top flanges $e$ of the upper arm $d$, and the lower part $p$ takes under or below said top flanges, and thereby the top flanges are gripped. This friction-grip holds the ear part $n$ of the hinge tight enough to prevent it from pulling off. When the handle is placed with its lateral flanges $f$ in position against the side of the pot, the edge of the hinge-base $o$ or the two hinge-ears $n$ will be in contact with the wall or the rim of the pot, and the rivets $g'$ will secure the handle and indirectly secure said hinge part. The center part of the hinge, which takes between the two ears, is fastened to the lid $m$, and a pin or pintle $q$ passes through the ears and through the center part of the hinge and completes the hinge.

The notches $b$ on the edges of the two halves of the handle-grasp form openings for the air, and these, with the hollow handle or grasp part, serve to maintain a cool condition of the handle even when the vessel contains hot liquid.

In the present instance the handle or grasp part is slightly tapered; but it is obvious it might be different. Also, the handle when attached to a vessel may be placed vertical, as shown in Fig. 1, or horizontal, as it would be on a dish-pan.

Having thus described my invention, what I claim is—

1. A handle for vessels, having a sheet-metal hand-grasp part composed of two half-cylindric parts each provided with two lateral arms—said half-cylindric part and arms stamped up in one piece and the lateral arms on one half-cylindric part coinciding with those on the other part and forming two finished arms; and two disks each taking over one of the ends of said hand-grasp parts and fastening them together.

2. A handle for vessels, having a sheet-metal hand-grasp part composed of two half-cylindric parts provided with outward flanges, c, on their ends; and two disks each having a rim-flange, an annular shoulder inside of the said flange, and an annular groove between the rim-flange and said shoulder, one of said disks being on each end of the said half-cylindric parts with the rim-flange of the disk closed inward and on the said outward flange.

3. A sheet-metal handle for vessels, composed of two half-cylindric parts provided on their longitudinal edges with notches, and at their ends with outward flanges; two disks each having a rim-flange which is closed inward and locks on said outward flanges, and lateral arms for attachment to a vessel.

4. The combination of a vessel; a lid for the vessel having one part of a hinge; a sheet-metal handle composed of two half-cylindric parts each provided with a lateral arm attached to the vessel—said arm having a top horizontal flange; and hinge-ears secured to a clip which grips said top horizontal flange—said hinge-ears coöperating with the other part of the hinge on the lid, as set forth.

In testimony whereof I affix my signature in the presence of two witnesses.

CHARLES L. WAGANDT.

Witnesses:
GEO. E. TAYLOR,
CHAPIN A. FERGUSON.